(12) United States Patent
Kirkby et al.

(10) Patent No.: US 7,363,371 B2
(45) Date of Patent: Apr. 22, 2008

(54) TRAFFIC FLOW MANAGEMENT IN A COMMUNICATIONS NETWORK

(75) Inventors: Paul Kirkby, Harlow (GB); Peter Hamer, Bishops Stortford (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1559 days.

(21) Appl. No.: 09/750,903

(22) Filed: Dec. 28, 2000

(65) Prior Publication Data

US 2002/0120768 A1    Aug. 29, 2002

(51) Int. Cl.
*G06F 13/00* (2006.01)

(52) U.S. Cl. .................................................. 709/225

(58) Field of Classification Search ............ 709/223, 709/235, 224; 370/230, 232, 395.21, 229, 370/252, 329, 351, 395.2, 468, 230.1, 233, 370/322; 705/37; 379/114.01
See application file for complete search history.

(56) References Cited

U.S. PATENT DOCUMENTS

| | | | | |
|---|---|---|---|---|
| 3,761,818 | A | * | 9/1973 | Tazaki et al. ............... 375/293 |
| 4,912,702 | A | * | 3/1990 | Verbiest ...................... 370/538 |
| 5,101,353 | A | * | 3/1992 | Lupien et al. ................. 705/37 |
| 5,274,644 | A | * | 12/1993 | Berger et al. ............... 370/230 |
| 5,276,677 | A | * | 1/1994 | Ramamurthy et al. ...... 370/232 |
| 5,289,462 | A | * | 2/1994 | Ahmadi et al. ............. 370/232 |
| 5,848,139 | A | * | 12/1998 | Grover ................... 379/114.01 |
| 5,914,945 | A | * | 6/1999 | Abu-Amara et al. ........ 370/329 |
| 5,995,487 | A | * | 11/1999 | Weaver et al. ......... 370/395.21 |
| 6,032,113 | A | * | 2/2000 | Graupe ....................... 704/201 |
| 6,055,571 | A | * | 4/2000 | Fulp et al. .................. 709/224 |
| 6,085,241 | A | * | 7/2000 | Otis ........................... 709/223 |
| 6,208,640 | B1 | * | 3/2001 | Spell et al. ................. 370/358 |
| 6,424,993 | B1 | * | 7/2002 | Weber ........................ 709/203 |
| 6,460,036 | B1 | * | 10/2002 | Herz ........................... 707/10 |
| 6,487,218 | B1 | * | 11/2002 | Ludwig et al. ............. 370/469 |
| 6,516,192 | B1 | * | 2/2003 | Spaur et al. ................ 455/450 |
| 6,556,548 | B1 | * | 4/2003 | Kirkby et al. .............. 370/322 |
| 6,580,691 | B1 | * | 6/2003 | Bjoerkman et al. ......... 370/232 |
| 6,625,155 | B1 | * | 9/2003 | Dziong .................... 370/395.2 |
| 6,628,609 | B2 | * | 9/2003 | Chapman et al. ........... 370/229 |
| 6,628,612 | B1 | * | 9/2003 | Sabry et al. ................ 370/230 |
| 6,671,285 | B1 | * | 12/2003 | Kirkby et al. .............. 370/468 |
| 6,678,245 | B1 | * | 1/2004 | Cooper et al. ............. 370/230 |
| 6,724,722 | B1 | * | 4/2004 | Wang et al. ................ 370/229 |
| 6,728,266 | B1 | * | 4/2004 | Sabry et al. ................ 370/468 |
| 6,771,648 | B1 | * | 8/2004 | Kim et al. ............... 370/395.2 |

(Continued)

OTHER PUBLICATIONS

Nick Duffield et al., "Charging From Sampled Network Usage", IMV'01, Nov. 1-2, 2001, USA, pp. 245-256.*

(Continued)

*Primary Examiner*—Robert B. Harrell
(74) *Attorney, Agent, or Firm*—Barnes & Thornburg LLP

(57) ABSTRACT

Admission of rapidly varying traffic flows to a communications network is controlled by sampling the traffic flows each at an ingress, and sampling an aggregate flow of said flows at some or all of the resources used by the aggregate flow. From this sampling, a mean bandwidth requirement for each traffic flow and a measure of the variance from that mean are determined. First and second prices for the mean and variance components of the controlled traffic flows that are calculated. These price calculations are used to determine an admission cost for each said flow so as to regulate the admission of that flow via a feedback price mechanism.

16 Claims, 4 Drawing Sheets

U.S. PATENT DOCUMENTS

| | | | |
|---|---|---|---|
| 6,788,646 B1* | 9/2004 | Fodor et al. | 370/230 |
| 6,801,501 B1* | 10/2004 | Knightly et al. | 370/233 |
| 6,819,662 B1* | 11/2004 | Grover et al. | 370/351 |
| 6,873,600 B1* | 3/2005 | Duffield et al. | 370/252 |
| 6,894,972 B1* | 5/2005 | Phaal | 370/229 |
| 6,912,214 B2* | 6/2005 | Madour et al. | 370/340 |
| 6,912,232 B1* | 6/2005 | Duffield et al. | 370/468 |
| 6,914,883 B2* | 7/2005 | Dharanikota | 370/230.1 |
| 6,928,053 B1* | 8/2005 | Kadengal | 370/232 |
| 6,954,739 B1* | 10/2005 | Bouillet et al. | 705/63 |
| 6,958,978 B1* | 10/2005 | Ireland et al. | 370/252 |
| 7,058,704 B1* | 6/2006 | Mangipudi et al. | 709/223 |
| 2001/0025310 A1* | 9/2001 | Krishnamurthy et al. | 709/223 |
| 2002/0038360 A1* | 3/2002 | Andrews et al. | 709/223 |
| 2002/0097747 A1* | 7/2002 | Kirkby et al. | 370/468 |
| 2002/0138643 A1* | 9/2002 | Shin et al. | 709/232 |
| 2002/0163887 A1* | 11/2002 | Suni et al. | 370/232 |
| 2003/0101263 A1* | 5/2003 | Bouillet et al. | 709/225 |
| 2004/0022191 A1* | 2/2004 | Bernet et al. | 370/230 |
| 2004/0136379 A1* | 7/2004 | Liao et al. | 370/395.21 |

OTHER PUBLICATIONS

Nick Duffield et al., Predicting Resource Usage And Estimation Accuracy In An IP Flow Measurment Collection Infrastructure IMC'03, Oct. 27-29, 2003, USA.*

Peerapon Siripongwutikorn et al., "A survey Of Adaptive Bandwidth Control Algorithms", IEEE 2003, 16 pages.*

F.P. Kelly, "Charging And Rate Control For Elastic Traffic", 1997, ETT, vol. 8, pp. 33-37. F.P. Kelly et al., "Rate Control in Communication Networks: Shadow Prices, Proportional Fairness And Stability", 1998, JORS 49, pp. 237-252.*

F.P.Kelly, "Resource Pricing And The Evolution Of Congestion Control", 1999, Automatica 35, 35 pages.*

Grossglauser et al., A Framework For Robust Measurement-Based Control, Jun. 1999, IEEE, vol. 7, No. 3.*

Judith A. Molka-Danielsen et al., "Pricing In Admission Policy:Using Hold Options Over IP Networks", Aug. 24, 1999, Dept. O Informatics Molde College, Norway, 18 pages.*

Hal R. Varian, "Estimating The Demand For Bandwidth", Aug. 1999, Univ. Of California, Berkeley, 11 pages.*

Courcoubetis et al., "Providing Bandwidth Guarantees Over A Best-Effort Network: Call-Admission and Pricing", 1999, EU's Framework project.*

Papaioannou et al., "Efficient Agent-Based Selection Of DiffServ SLAs Over MPLS Network Within The ASP Server Model", 1999 EU IST project.*

Junseok Hwang, "Market-Based QoS Interconnection Economy In The Next-Generation Internet", Dec. 2000, School Of Information Studies, Syracuse University, Syracuse, NY, USA, 27 pages.*

Costas et al., "Managing And Pricing Services Level Agreements For Differentiated Services", 1999, IEEE/TFIP IWQoS99, 9 pages.*

Hal R. Varian, "Estimating the Demand For Bandwidth", Aug. 29, 2000, University of California, Berkeley, 11 pages.*

Yuhong et al., "Usage-Sensitive Pricing in Multi-Service Networks", Aug. 2, 2000, University of Kansas, 46 pages.*

Robert Morris, "Variance Of Aggregated Web Traffic", 2000 IEEE, 7 pages.*

Duffield et al., "Charging From Sampled Network Usage", Nov. 1-2, 2001, AT&T Labs-Research,IMW'01, pp. 245-256.*

* cited by examiner

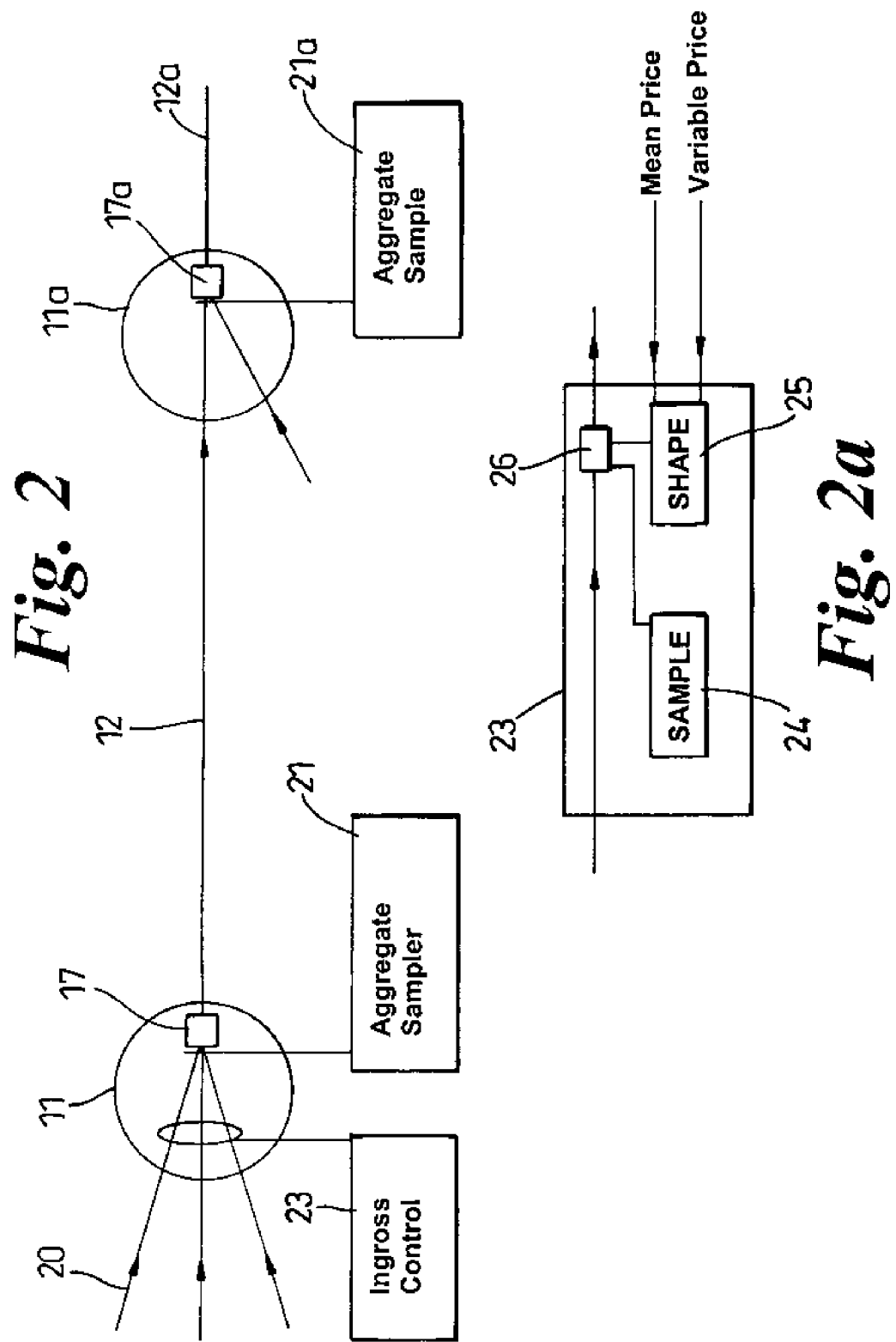

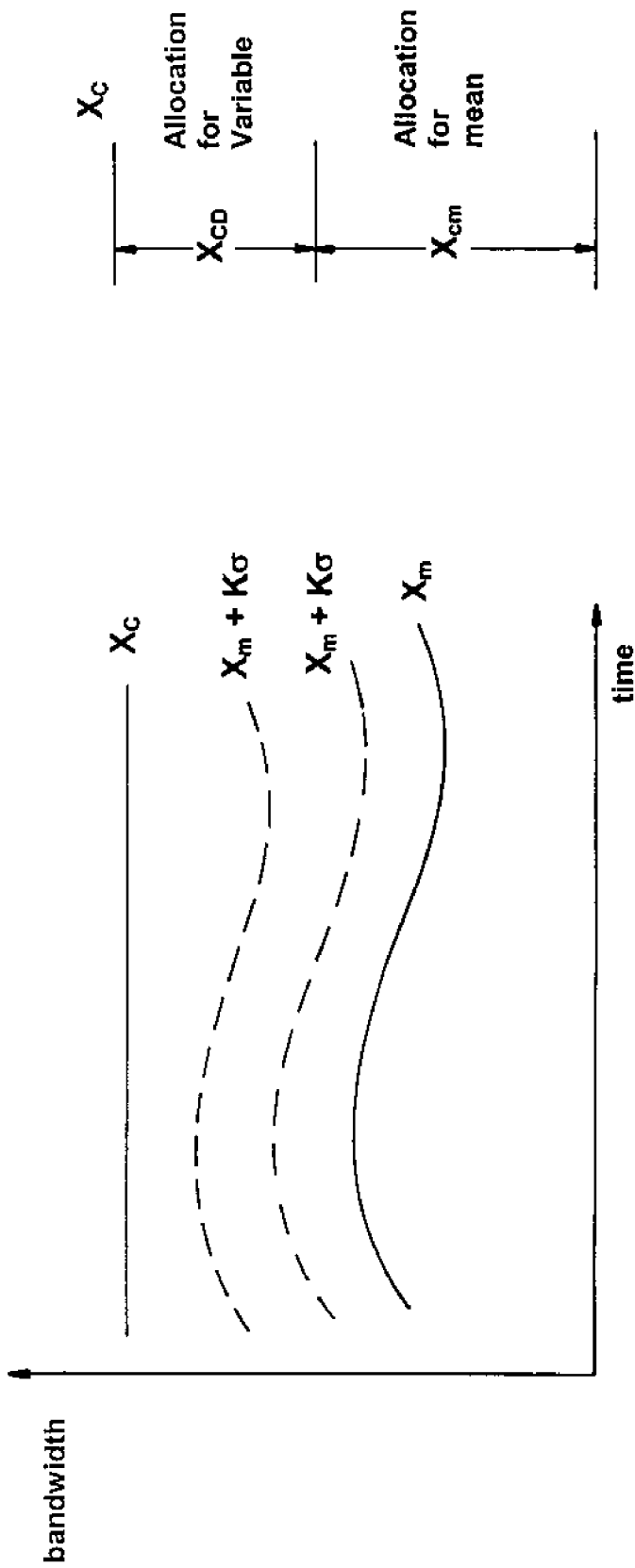

TRAFFIC FLOW MANAGEMENT IN A COMMUNICATIONS NETWORK

FIELD OF THE INVENTION

This invention relates to methods and apparatus for controlling traffic flow in a communications network so as to reduce congestion.

BACKGROUND OF THE INVENTION

Increasing volumes of communications traffic are now being carried on packet networks, and in particular on Internet Protocol (IP) networks. Such networks comprise nodes or routers interconnected by links so as to define a mesh. A recent introduction has been the concept of a network having an optical core in which traffic is carried on switched optical fiber paths between routers. The core is accessed by an edge networks Typically in the design of high capacity IP networks. routers are classified as either core routers or edge routers. Edge routers carry out all the network ingress and egress functions, in particular controlling the incoming traffic streams across the network. Core routers act as transit routers forwarding network traffic from one network node to another.

In such a network, the user data is assembled into packets and each packet is provided with a header identifying the destination of the packet and optionally, including routing information. The header may further contain information misting to the router chosen to route the packet contents and identifying a priority class for the packet. For example, packets containing high quality of service real time traffic, such as voice, will be accorded the highest priority, while packets containing 'best efforts' data may be accorded a low priority.

A particular problem that has been experienced with certain types of traffic, particularly data traffic and real-time video traffic, is its inherently bursty nature. Further, this burstiness occurs on a timescale that is shorter than feasible network control loop timescales, and thus can lead to congestion when traffic is heavy. When congestion occurs, ordinary data traffic which is not critically time sensitive can be briefly buffered in the routers which are experiencing congestion. Urgent data traffic and real time interactive services such as voice and video cannot be delayed.

In order to maximize the overall network utilization, it is desirable to perform statistical multiplexing of traffic traversing the network while providing a prior allocation of resources and protection particularly for the delay sensitive traffic Existing control and feedback mechanisms are however inadequate to respond to this bursty traffic at a sufficiently rapid rate to provide this resource allocation and protection. In The conventional approach to this problem, the high speed statistical variations in traffic flow are simply allowed for by setting large margins in the setting of control levels for determining feedback price. Proposals for 'pricing' ingress flows at the edge of the network for admission control purposes have involved for instance measuring the 'effective bandwidth' of the flow. Effective bandwidth is a measure of the bandwidth that needs to be reserved to give a desired packet loss for delay rate on a statistically varying flow. Unfortunately, effective bandwidths do not add linearly on aggregation and so are difficult to use in a congestion price feedback control scheme.

SUMMARY OF THE INVENTION

An object of the invention is to minimize or to overcome these disadvantages.

According to a first aspect of the invention there is provided a method of controlling traffic flow in a communications packet network, the method comprising determining for flows within the network a mean utilization requirement and a measure of a variance from that mean, and determining from said mean and variance and bandwidth pricing so as to control the admission of said flows to the network.

Advantageously, control limits are set by the network operator for mean and variance, and the pricing is increased as one or both of these limits is approached so as to provide feedback control of admission to the network.

The control method may be embodied as software in machine readable form on a storage medium.

According to another aspect of the invention, there is provided a method of controlling admission of traffic flows to a communications network, the method comprising sampling the traffic flows each at an ingress, and sampling an aggregate flow of said flows at some or all of the resources used by the aggregate flow, determining from said sampling a mean bandwidth requirement for each traffic flow and a measure of the variance from That mean, determining from said mean and variance measurements first and second prices for the mean and variance components of the controlled traffic flows that are admitted to the network, and determining from said first and second prices an admission cost for each said flow so as to regulate the admission of that flow.

According to a further aspect of the invention, there is provided an admission control arrangement for a communications network, the arrangement comprising sampling means for sampling a traffic flow, means for determining from said sampling means a measure of mean bandwidth requirement and of a variance from that mean, and price computation means for determining from said mean and variance a cost or price for bandwidth case so as to provide ingress price control for admission of the traffic flow to the network.

The admission control arrangement may be incorporated in a network manager, e.g. in software form.

In our arrangement and method, overall resource utilization is optimised by the use of congestion price based feedback that separates out the components of price that affect the mean traffic flow from the standard deviation of the flow. It is well known that on aggregation, standard deviations add according) to a square route law and means add linearly. In a mixed traffic flow type network, a network flow optimisation process that separates these components can provide improved overall resource utilization. A further advantage of this arrangement and method is that it enables a fairer allocation of 'network-price' to any given ingress flow. Rather than simply allocating the network charges on the basis of mean ingress flow, the charges are based on a measure of mean and standard deviation. This discourages users from abusing the network by sending excessively bursty traffic, unless it is genuinely important to the user. It should be noted that the terms prices and charges as employed herein refer to an internal network currency used for admission control purposes and is generally separate from any real billing.

BRIEF DESCRIPTION OF THE DRAWINGS

Embodiments of the invention will now be described with reference to the accompanying drawings in which:

FIG. 2 illustrates the aggregation of traffic flows at a node in the network of FIG. 1;

FIG. 2a shows the construction of an ingress controller;

FIG. 5a illustrates the measured mean and standard deviation of a traffic aggregate; and FIG. 5b illustrates the primary flow control level and its division into separate allocations for variance and mean.

DESCRIPTION OF PREFERRED EMBODIMENTS

Figure 1:
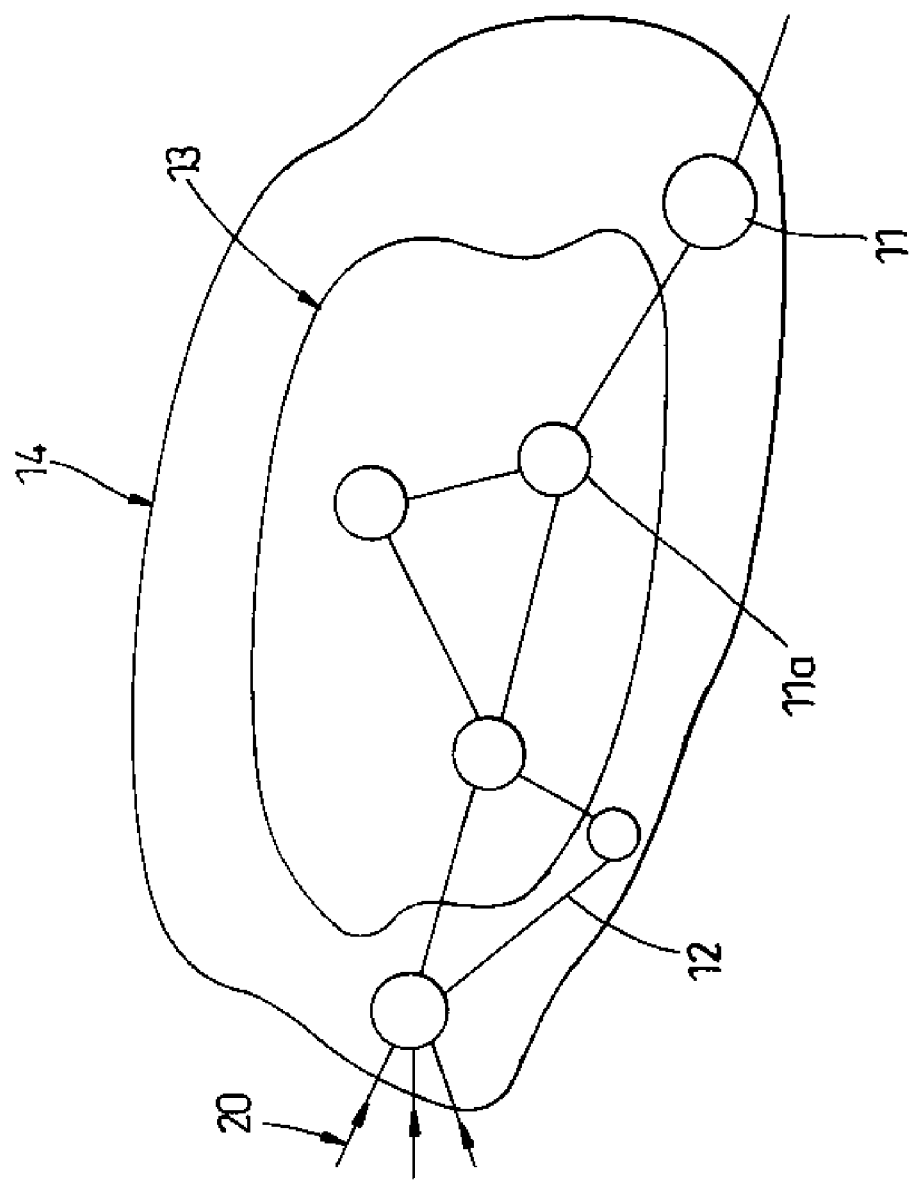
FIG. 1 is a selective design of an exemplary network.

Referring first to FIG. 1, this shows an exemplary network in schematic form. As shown in FIG. 1, the network comprises a number of nodes 11, 11a interconnected by links 12. As shown in FIG. 1, the network comprises a care region 13 accessed via an edge region 14. The links 12 are usually optical fiber links, particularly in the core region. Advantageously the network of FIG. 1 is an Internet Protocol (IP) or MPLS (multi protocol label switched) network in which traffic is transported in packet form. An objective of the resource control system is to control the ingress of IP and MPLS traffic in such a way that different traffic classes are treated optimally. In particular, delay sensitive classes of traffic must see minimal congestion inside any router or on entering any of the packet buffers at the entrance to each optical link.

Referring now to FIG. 2, this shows in schematic form a an edge node 11 and a core network node 11a. At the edge node 11, a number of input traffic flows are aggregated on to a traffic path on link 12. At the core node 11a two transit traffic flows are shown merging. Prior to entering the packet buffer 17 at the entrance to transmission link 12, the traffic is sampled by the aggregate sampling circuit 21. At the entrance to the next link 12a on the traffic path 12 a similar measurement arrangement of packet buffer 17a and aggreaate sampling circuit 21a exists. The traffic flows are sampled by sampling circuits 21 and 21a to determine both the mean bandwidth usage $x_i$ and the standard deviation $\sigma l$ from the mean for each aggregated flow across the network. The mean and standard deviation measurement are processed by a network admission controller to determine a pair of prices for using that particular resource. This price pair defines separate prices for the mean component of traffic flow and the deviation (or variance) component. A separate ingress controller 23 (FIG. 2a) in the edge router has a sampler 24 that samples and measures the mean and deviation of individual edge to edge flows entering the network. The ingress controller also continuously monitors the sum of the resource price pairs for the edge to edge path it is using. (note there is one ingress controller per edge to edge path, the explicit edge to edge path being defined for instance by MPLS labels attached to each packet. The user (or a software object using pre-agreed ingress control rules) can then either accept this price or modify this mean bandwidth or standard deviation bandwidth requirements to obtain his optimum quality of service vs price. To modify the ingress traffic flow the ingress controller could use the a traffic shaper 25 (FIG. 2a) or for example send a signal back to the original traffic source (not shown). The traffic shaper controls a scheduler 26. This price feedback mechanism provides a self-regulating mechanism on the bandwidth demands imposed on the network.

The ingress controller 23 controls traffic on every end to end path through the network. The paths may be MPLS paths.

Figure 3A:
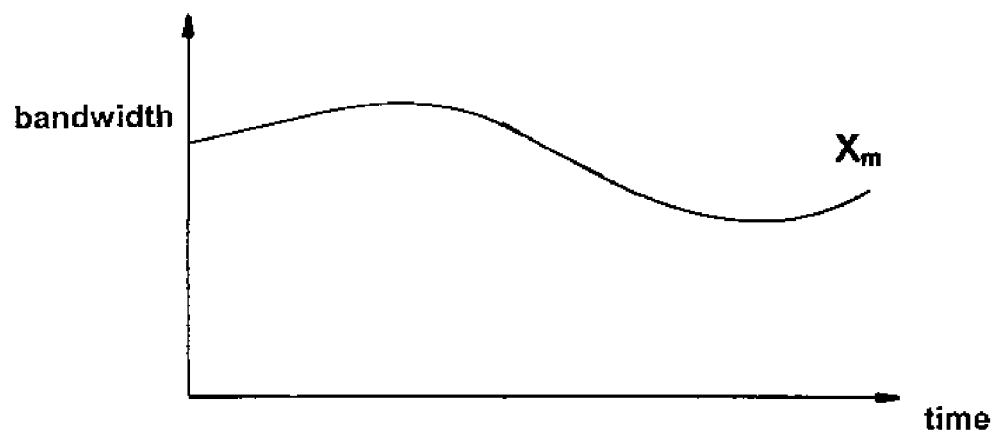
FIGS. 3a and 3b illustrate idealised and practical bandwidth demands for a traffic flow.
Figure 3B:
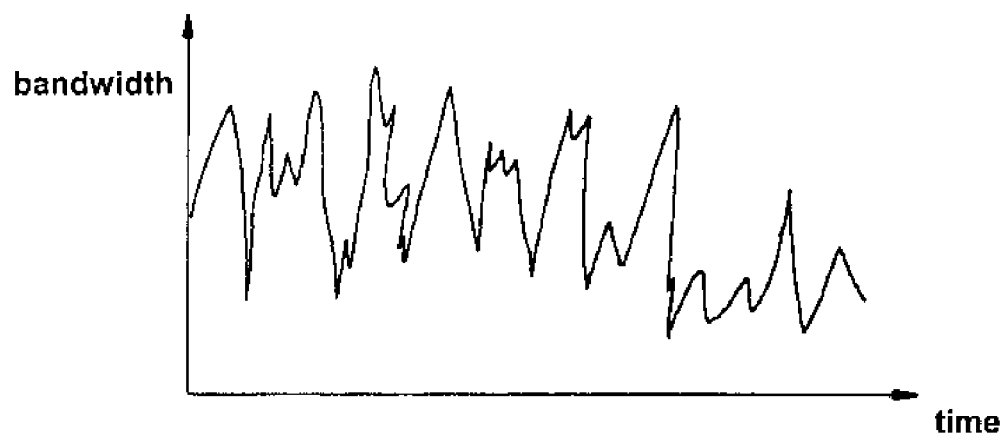

Referring now to FIGS. 3a and 3b, these illustrate respectively idealised and practical bandwidth requirements for a traffic flow. FIG. 3a shows a slowly varying mean bandwidth demand, while figure 3b shows a typical rapid short term variation superimposed on the mean.

Figure 4:
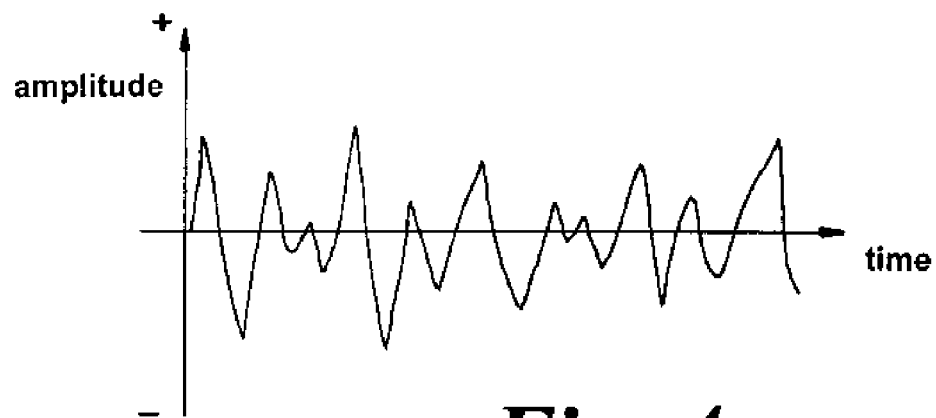
FIG. 4 illustrates the variance of the traffic flow of FIG. 3.

The short term variations, which represent the deviations of the traffic fibw from the mean, are illustrated in FIG. 4. These can be statistically analysed in real time to give a measure of mean and standard deviation. This analysis also gives the variance which is the square of the standard deviation, A variety of algorithms could be used for this purpose. The exponentially weighted time averaged mean is one of the simplest, whilst the sampled data and the mean together can be used to give the time averaged variance. The rest of this description makes the assumption that the sampling periods and rate and time averaging parameters used for ingress control purposes are sufficiently similar to those used by the aggregate flow meters that insignificant errors are caused. Typically the time averaging time constant is greater than the feedback time constants of the DRC control system, Typically 100 ms to 10 seconds. The variance sampling period is typically sufficiently short that the shortest bursts one is interested in controlling are captured. This implies that a sampling time period does not need to be much shorter than the specified worst case permitted delay variation for the traffic being controlled. 1-10ms (milliseconds) might be appropriate for typical delay sensitive traffic. (Longer sampling periods could be tolerated if margins were increased. A measure of the significance of these rapid short term variations is given by the standard deviation (σ) or by the corresponding variance $\sigma^2$.

In the arrangement of FIG. 2a in which a number flows are aggregated on a common path, assuming that traffic deviations are uncorrelated in time, the standard deviation $\sigma_A$ of the aggregate flow is given by the expression $$\sigma_A \sqrt{\sigma} \Sigma \sigma_i^2$$

The aggregated mean traffic of course adds linearly so the aggregated mean flow and is given by the expression $$x_A = \Sigma x_i$$

Referring now to FIG. 5a, this illustrates a bandwidth plan from which pricing information is determined to provide feedback control for admission to the network. In FIG. 5a, the network operator sets a peak bandwidth maximum or control level $x_c$ which, in the ordinary course of events should not be exceeded, even momentarily by the peak bursts of the aggregated traffic. A typical flow has a mean bandwidth $X_A$ well below this maximum level. Further, to minimise the risk of congestion, this mean $X_A$ should be at least one and preferably 'k' standard deviations below this control level $x_c$. To ensure that the probability of momentary congestion is sufficiently small for all practical purposes k should typically lie in the range 3 to 6.

In a preferred embodiment, separate price calculations are performed from the mean $x_A$ and standard deviation $\sigma_A$ demands on the network as follows.

The network operator subdivides the control level bandwidth into two sub allocations, $x_{CM}$ the allocation for the mean flow, and $x_{CD}$ the nominal allocation for the components of flow that deviate from the mean. These two allocations are related to the control level by the equation $x_C = x_{CM} + x_{CD}$, as illustrated in FIG. 5b. We determine the mean pricing $P_x$ as a function of the mean demand and the control level for mean traffic. This price will typically be quoted by the resource in terms of a price per unit bandwidth.

i.e. $P_x = F(x_{CM}, X_A)$

In a discrete system, in which price is updated at regular intervals, $\Delta t$, an example function might be.

$P_x(t+1) = |P_x(t) + \beta \Delta t (x_{CM} - x_A)|+$

This equation indicates that the new price at the end of the current time interval equals the current price plus a gain factor times the time interval and the difference between the control level for mean traffic and the current mean flow. The outer brackets with subscript + sign signifies that the solution is constrained to be positive. The parameter $\beta$ is the feedback gain. This is an example of an integrating control feedback system, as the error signal is integrated over time to produce change in price. Other variants include differential and proportional feedback.

Similarly, we define the variance pricing $P_V$ in terms of the measured standard deviation $\sigma_A$ and the control level $x_{CD}$. This price will typically have, units of price per unit time per unit bandwidth variance. i.e.

$P_V = F(x_{CD}, \sigma_A)$

In a discrete system an example function might be $P_V(t+1) = |P_V(t) + \alpha \Delta t (x^2_{CD} - k^2 \sigma^2_A)|+$ This equation indicates that the new variance price at the end of the current time interval equals the current price plus a gain factor times the time interval and the difference between the square of control level for deviation aid the square of k times the measured aggregate variance. The outer brackets with subscript + sign signifies that the solution is constrained to be positive. The parameter $\alpha$ is the feedback gain. This is an example of an integrating control feedback system, as the error signal is integrated over time to produce change in price. Other variants include differential and proportional feedback.

In both these examples the price increases rapidly as the argument of the inner bracket (the error signal) goes positive.

A more sophisticated pricing may be obtained by introducing a second order term which takes into account the first and/or second differentials of the traffic flow means and deviations. In that case the pricing functions become $$P_m = F\left((x_{cm}, x_A), \frac{dx_A}{dt}, \frac{d^2 x_A}{dt^2}\right) \text{ and } P_V = F\left((x_{CD}, \sigma_A, \frac{d\sigma_A}{dt}, \frac{d^2 \sigma_A}{dt^2}\right)$$

The price that is fed back to the user is in the form of the two separate prices $P_m$ and $P_V$. These prices can be quoted in terms of a price per unit bandwidth and a price per unit variance. The total 'price' charged to the user is then determined by measurements on the traffic leaving the user of the mean and variance of his traffic. These are multiplied by the prices per unit and added together to give the total price to the user T. This enables the network (and optionally) the user to see a much fairer estimate of the network 'cost' to transport that particular flow. This information can then be used for admission control purposes, for instance for smoothing the flow to reduce the variance component of the low or reducing or even shutting off the mean flow if the total price T is becoming excessive. It can also be used for admission control of inelastic traffic flows where a user would ask for admission of a guaranteed flow with certain quoted mean and variance characteristics. Once admitted, the ingress controller of such inelastic traffic flows is committed to allow the ingress of traffic within the pre agreed limits, irrespective of how high the internal congestion price subsequently goes.

The technique enables finely differentiated services to be provided by control of ingress flows at the network edge. Some users may, for instance want a class of service which highly values the transmission of bursty traffic without delay These users would have a service level agreement that assigned a high WtP (willingness to pay) to the variance component of the traffic. Thus even in high congestion the bursts from such users would be allowed into the network whilst other users with a low WtP for variance would have their traffic bursts smoothed and hence momentarily delayed.

A modification of the schemes described above is a system in which the sub-allocations of bandwidth for mean and standard deviation control levels $x_m$ and $x_{CM}$ are not defined by management fiat but are estimated dynamically from the measurements of mean and deviation parameters of the incoming aggregate flows. The management system still defines the bandwidth peak maximum control level $x_C$. The simplest way to determine the standard deviation allocation is simply to define $x_{CD} = x_C - x_A$ That is to say the allocation for standard deviation is simple taken to be the difference between the current mean traffic level and the peak maximum control level. This has the advantage that as the mean level rises towards the peak bandwidth control level, the variance price rises in an inverse square manner, drastically curtailing new traffic bursts. When the network has only low mean traffic, the variance price is extremely low and bursty traffic is hardly discouraged at all.

In this case it would be natural to define the control level for the mean flow as $x_{CM} = x_C - k\sigma_A$ That is to say the mean control level is defined as the peak bandwidth control level minus K times the currently measured standard deviation. In practice caution may suggest that other constraints such as a minimum bandwidth margin between the peak control level and the mean control level are added.

For optimum resource usage in a future system in which the ingress controllers actively adjust the shaping of the mean and deviation components of their traffic in response to mean and deviation prices and the class of traffic being transmitted, then maximum user utility would be obtained when proportional fairness is applied to the allocation split between mean and deviation traffic. The resource would thus adjust the ratio of $x_{CM}$ to $x_{CD}$ to be the same as the current revenue from mean traffic and the current revenue from the variance component of the traffic. These adjustments would have to be carried out slowly in comparison to the DRC feedback control time constant or instability could result.

The price for traffic traversing a series of resources along a path is optimally found by adding the prices at each resource linearly. Thus, the prices per unit bandwidth for the mean flows for traffic flowing along a particular path are found by adding the prices per unit bandwidth of the means in each resource that the path utilizes. We have found that, for optimum results, the price per unit variance should be determined by adding the price per unit variance of each resource that the path utilizes, rather than adding the price per unit standard deviation.

In a further modification, particularly bursty traffic can incur a further price penalty by the user of an exponential weighting on the standard deviation measurement This exponential weighting function can be used to weight large positive deviations of traffic flow from the mean more strongly than small deviations. This would be used as a second order correction to discourage users from transmitting large bursts of traffic unexpectedly at very high rates. Note that the use of variance rather than simple deviation from a mean already penalizes large sudden deviations with a square law dependency.

It will be understood that the above description of a preferred embodiment is given by way of example only and that various modifications may be made by those skilled in the art without departing from the spirit and scope of the invention.

The invention claimed is:

1. A method of controlling the admission of a traffic flow to a communications network, the method comprising the steps of:
   sampling an aggregated traffic flow on a network resource to which the traffic flow is to be admitted to obtain a mean bandwidth measurement and a bandwidth variance measurement of said aggregated traffic flow;
   determining from said mean bandwidth and variance measurements a price for bandwidth and a separate price for variance;
   sampling the traffic flow to be admitted to the network resource to measure its mean bandwidth and variance; and
   applying to said traffic flow the separate prices for bandwidth and variance at an ingress node to said communications network as a means of controlling admission of the traffic flow to the network resource.

2. The method of claim 1, wherein respective maximum control limits are defined for both the mean bandwidth and bandwidth variance components of the aggregated traffic flow on the network resource, and wherein at least one of said price for bandwidth and price for variance is increased as any of the mean bandwidth and variance measurements of said aggregated traffic flow approaches its respective limit.

3. The method of claim 2, wherein the determination of the bandwidth price is a function of the difference between the measured mean bandwidth of the aggregated traffic flow and the mean bandwidth control limit, and of the first and second derivatives against time of said function.

4. The method of claim 2, wherein the determination of the variance price is a function of the difference between the control limit and the sum of the measured variance of the aggregated traffic flow and a standard deviation corresponding to said variance, and of the first and second derivatives against time of said standard deviation.

5. The method of claim 1, wherein the price for bandwidth is determined as a price for unit bandwidth and the price for variance is determined as a price for unit variance.

6. The method of claim 5, wherein a total price for admission of the traffic flow to the network resource is provided to an admission controller of said traffic flow, said total price comprising the sum of the following products: i) the measured mean bandwidth of the traffic flow times the price per unit bandwidth for using the network resource; and ii) the variance of the traffic flow times the price per unit variance for using the network resource.

7. The method of claim 1, wherein an admission controller associated with the traffic flow regulates at least one of the mean bandwidth and variance of said traffic flow.

8. The method of claim 7, wherein said admission controller comprises an ingress controller in an edge node of the communications network.

9. A network manager for a communications network, comprising:
   a first traffic flow sampler for sampling aggregated traffic flow on a network resource to which a traffic flow is to be admitted to obtain a mean bandwidth measurement and a bandwidth variance measurement of said aggregated traffic flow;
   price computation means for determining from said mean bandwidth and variance measurements a price for bandwidth and a separate price for variance;
   a second traffic flow sampler for sampling the traffic flow to be admitted to the network resource to measure its mean bandwidth and variance; and
   an ingress traffic controller for applying to said traffic flow the separate prices for bandwidth and variance as a means of controlling admission of the traffic flow to the network resource.

10. The network manager of claim 9, wherein the network manager defines respective maximum control limits for both the mean bandwidth and bandwidth variance components of the aggregated traffic flow on the network resource, and wherein said manages increases at least one of said price for bandwidth and price for variance as any of the mean bandwidth and variance measurements of said aggregated traffic flow approaches its respective limit.

11. The network manager of claim 10, wherein the price computation means determines the bandwidth price as a function of the difference between the measured mean bandwidth of the aggregated traffic flow and the mean bandwidth control limit, and of the first and second derivatives against time of said function.

12. The network manager of claim 10, wherein the price computation means determines the variance price as a function of the difference between the control limit and the sum of the measured variance of the aggregated traffic flow and a standard deviation corresponding to said variance, and of the first and second derivatives against time of said standard deviation.

13. The network manager of claim 9, wherein the price computation means determines the price for bandwidth as a price for unit bandwidth and the price for variance as a price for unit variance.

14. The network manager of claim 9, wherein the price computation means provides a total price for admission of the traffic flow to the network resource to an admission controller of said traffic flow, said total price comprising the sum of the following products: i) the measured mean bandwidth of the traffic flow times the price per unit bandwidth for using the network resource; and ii) the variance of the traffic flow times the price per unit variance for using the network resource.

15. An admission controller for admitting traffic flows to a network resource in a communications network, the controller comprising:
   a traffic flow sampler for sampling a traffic flow to be admitted to the network resource to measure its mean bandwidth and variance; and
   an ingress traffic controller for receiving a price for bandwidth and a separate price for variance from a network manager;

said ingress traffic controller being arranged to apply to said traffic flow the separate prices for bandwidth and variance received from the network manager as a means of controlling admission of the traffic flow to the network resource.

16. A computer readable medium comprising program code for configuring a network manger of a communications network, said program code comprising:

code for sampling aggregated traffic flow on a network resource to which the traffic flow is to be admitted to obtain a mean bandwidth measurement and a bandwidth variance measurement of said aggregated traffic flow;

code for determining from said mean bandwidth and variance measurements a price for bandwidth and a separate price for variance;

code for sampling the traffic flow to be admitted to the network resource to measure its mean bandwidth and variance; and code for applying to said traffic flow at an ingress node to said communications network the separate prices for bandwidth and variance as a means of controlling admission of the traffic flow to the network resource.

* * * * *